March 22, 1960

N. BERMAN 2,930,034

CONTACTLESS SWITCH

Filed Nov. 1, 1956

INVENTOR
NELSON BERMAN
BY
ATTORNEY

March 22, 1960 N. BERMAN 2,930,034
CONTACTLESS SWITCH
Filed Nov. 1, 1956 4 Sheets-Sheet 2
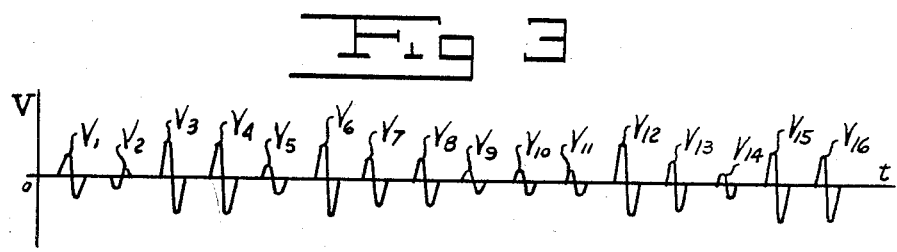
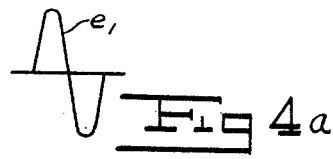
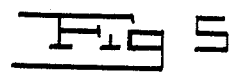
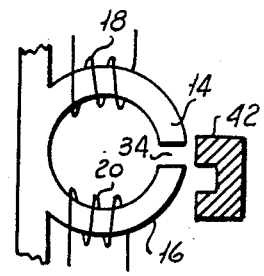
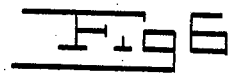
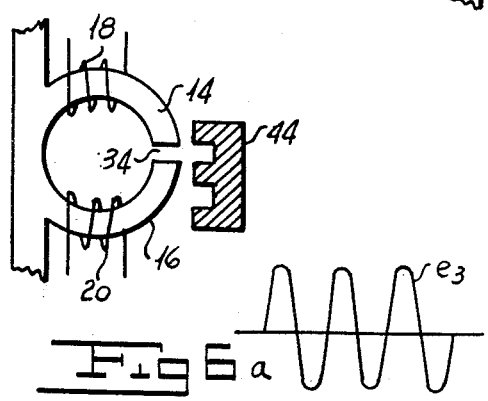
INVENTOR
NELSON BERMAN
BY
ATTORNEY

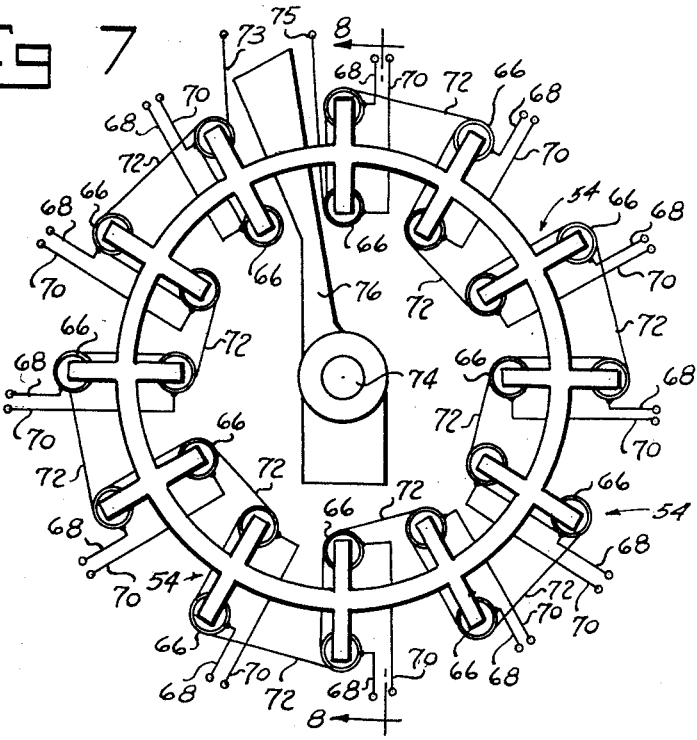

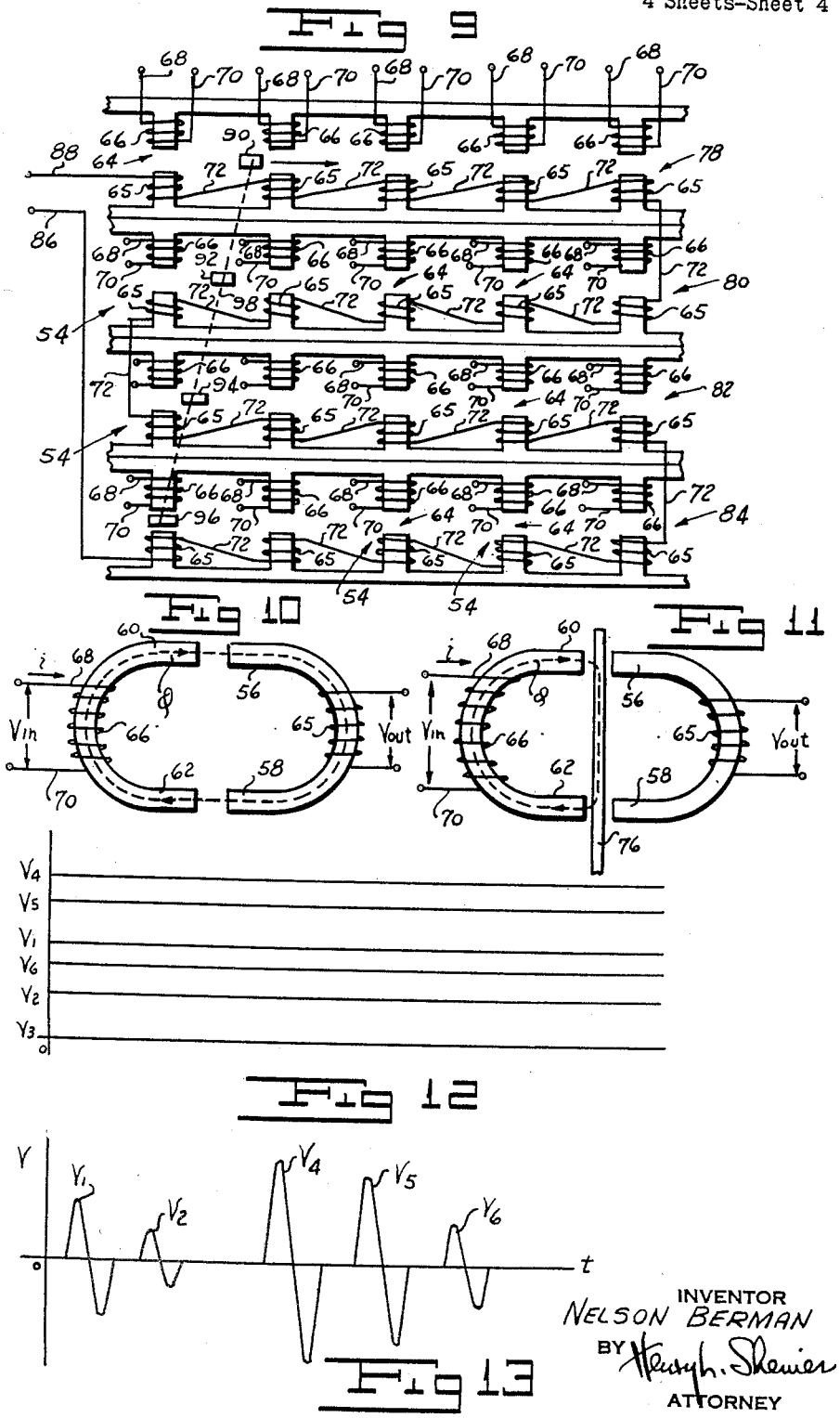

United States Patent Office 2,930,034
Patented Mar. 22, 1960

2,930,034

CONTACTLESS SWITCH

Nelson Berman, New Hyde Park, N.Y., assignor, by mesne assignments, to United Aircraft Corporation, East Hartford, Conn., a corporation of Delaware Application November 1, 1956, Serial No. 619,849

10 Claims. (Cl. 340—364)

My invention relates to a contactless switch and more particularly to a contactless switch for sequentially sampling a plurality of voltage analogues of physical variables.

Where a plurality of physical variables are to be measured, a plurality of individual indicating devices may be associated with the respective sensing means, such as gauges or the like. In most instances it is not necessary that continuous indications of the respective variables be provided. It is sufficient if an indication of each variable is provided periodically. Where such periodic observations or indications are sufficient, the variables may be sampled sequentially by a unitary device. Many gauges or the like employed to sense the variables provide voltage analogues of the variable for actuating an indicator, recorder, or the like. Switches are known in the prior art for sequentially sampling voltage analogues of physical variables to afford periodic indications of the state or condition of the respective variables. These switches of the prior art employ a plurality of contacts connected to the respective gauges, or the like, which sense the variables. Means such as a brush or the like is employed to engage the contacts sequentially to connect the various gauges to an indicator, recorder, or the like. The contacts in these switches of the prior art become worn or dirty after a period of time. As a result, the voltage analogues provided by the sensing means do not give a correct indication of the condition of the variable being sensed. Further, the brushes employed in these switches require frequent adjustment. They must be replaced periodically if the switch is to function properly.

I have invented a contactless switch for sequentially sampling a plurality of voltage analogues of physical variables. My switch employs no brushes nor contacts. It is more rugged and reliable than sampling switches of the prior art. My switch may expeditiously be arranged to sample sequentially a large number of voltage analogues.

One object of my invention is to provide a contactless switch for sequentially sampling a plurality of voltage analogues of physical variables.

Another object of my invention is to provide a contactless switch which employs no brushes and contacts to be engaged by the brushes.

A further object of my invention is to provide a contactless switch which is more rugged and reliable than switches of the prior art.

Still another object of my invention is to provide a contactless switch which may expeditiously be arranged to sample sequentially a large number of voltage analogues.

Other and further objects of my invention will appear from the following description.

In general, my invention contemplates the provision of a contactless switch including a plurality of transformers each having a core, and primary and secondary windings carried by the core. I apply a plurality of voltage analogues of physical variables to the respective primary windings to produce fluxes in the cores. These fluxes like the respective secondary windings. In one form of my invention I sequentially vary the reluctance of the respective flux paths to produce secondary winding signals which are proportional to the respective voltage analogues. In a second form of my invention I sequentially shield the secondary windings from the primary windings to produce secondary winding signals proportional respectively to the voltage analogues.

In the accompanying drawings which form part of the instant specification and which are to be used in connection therewith and in which like reference numerals are used to indicate like parts in the various views:

Figure 3 is a representation of the respective secondary winding signals produced in the form of my contactless switch shown in Figure 1.

Figure 4 is a fragmentary view of one of the transformers of my contactless switch showing one form of linking flux varying means.

Figure 4a is a diagrammatic view showing the output wave form from the transformer shown in Figure 4.

Figure 5 is a fragmentary view of a transformer of my contactless switch showing a second form of linking flux varying means.

Figure 5a is a diagrammatic view showing the output wave form from the transformer of Figure 5.

Figure 6 is a fragmentary view of a transformer of my contactless switch showing a further form of linking flux varying means.

Figure 6a is a diagrammatic view showing the output wave form produced by the transformer shown in Figure 6.

Figure 7 is an elevation of an alternate form of my contactless switch.

Figure 8 is a sectional view of the form of my contactless switch shown in Figure 7, taken along the line 8—8 of Figure 7.

Figure 9 is a development showing a multiple arrangement of the form of my contactless switch shown in Figures 7 and 8.

Figure 10 is a schematic view showing the flux path of one of the transformers of the form of my invention shown in Figures 7 to 9 with no linking flux varying means in the transformer gap.

Figure 11 is a schematic view showing the flux path of a transformer of the form of my invention shown in Figures 7 to 9 with a linking flux varying means disposed in the transformer gap.

Figure 12 is a graph representing various voltage analogue levels.

Figure 13 is a representation of the secondary winding voltages produced in the form of my invention shown in Figures 7 to 9 with primary voltages corresponding to the voltage analogue levels shown in Figure 12.

Figures 1, 2:
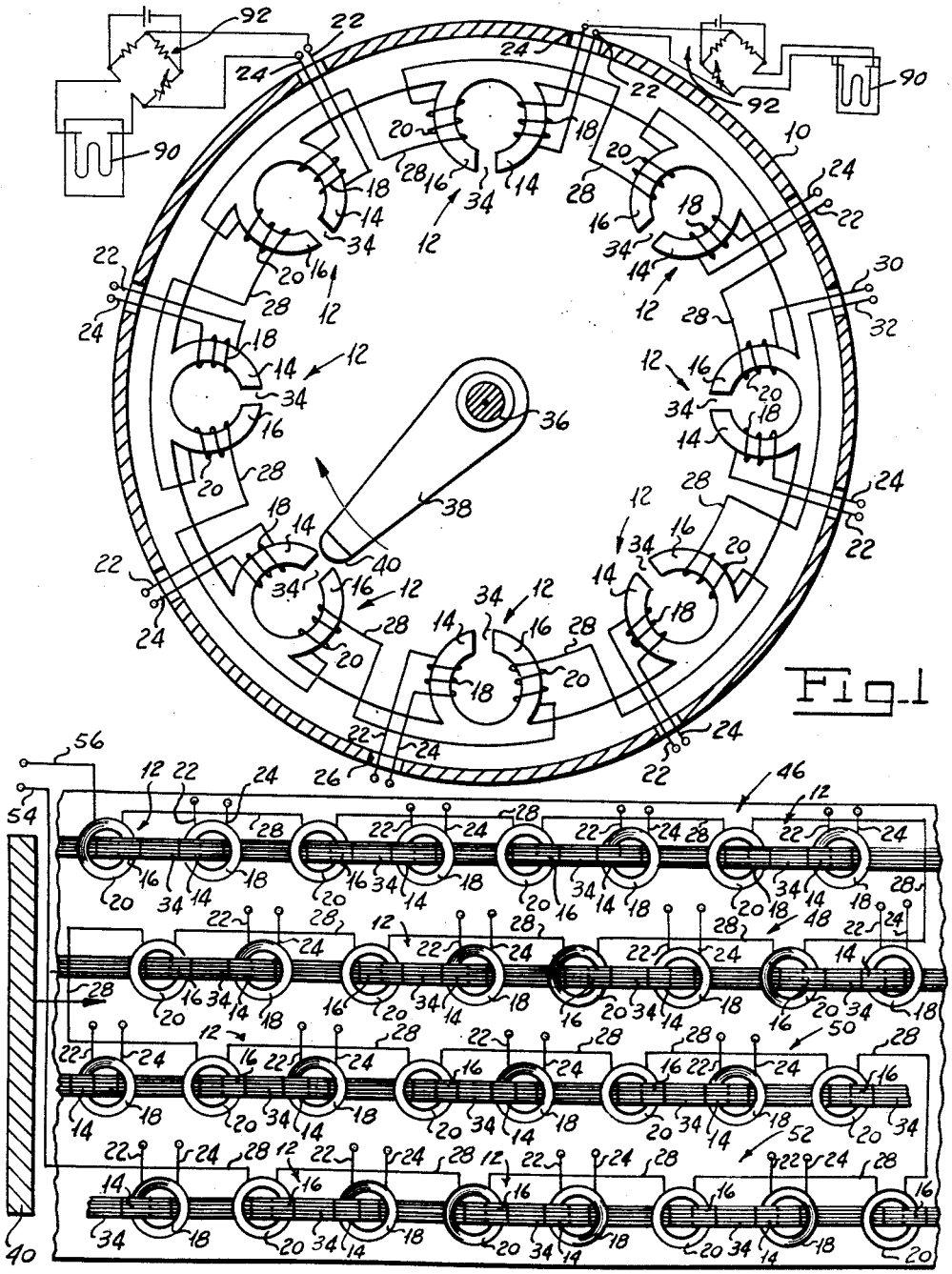
Figure 1 is a sectional view of one form of my contactless switch.
Figure 2 is a development of the form of my contactless switch shown in Figure 1.

More particularly, referring now to Figure 1 of the drawings, my contactless switch includes a housing or case 10 which may conveniently be cylindrical in shape. Disposed around the inner surface of the case 10 is a ring of transformers, each of which is indicated generally by the reference character 12. Each transformer 12 includes respective legs 14 and 16 carrying the primary winding 18 and the secondary winding 20 of the transformer. Conveniently, the transformer cores including legs 14 and 16 may be formed from a plurality of stacked laminations stamped or cut out of paramagnetic material. It will be seen that a number of these stacked laminations form the cores of a ring of transformers 12 disposed around the inner surface of housing 10. Respective pairs of conductors 22 and 24 provide means for applying to the primary windings 18 of transformers 12 voltage analogues of physical variables to be sampled. Each pair of conductors 22 and 24 passes through an opening 26 in casing 10 and is connected to a suitable voltage analogue producing sensing device such, for example, as a strain gauge. By way of example I have shown a pair of resistance strain gauges 90 of a type known in the art connected in Wheatstone bridges indicated generally by the reference characters 92, the output terminals of which are connected to the terminals 22 and 24 of a pair of primary windings 18. As is known in the art, when the gauges 90 are deformed owing to strains in the elements (not shown) to which they are applied, the bridges 92 produce output signals which are measures of the strains. For purposes of simplicity I have shown only two gauges 90. It will be understood that the other windings are connected to similar sources of voltage analogues of physical variables.

Conductors 28 connect the respective secondary windings 20 of the transformers 12 in series. A pair of conductors 30 and 32 connected to respective secondary windings 20 provide means for connecting the series-connected secondary windings 20 to a suitable indicating or recording means (not shown).

It will be appreciated that the voltage analogues applied to primary windings 18 produce respective fluxes in the transformer cores including legs 14 and 16. Each pair of legs 14 and 16 forms an air gap 34. Air gaps 34 reduce the flux in the transformer cores from that which would exist in closed cores having no air gaps. It will be understood that the respective core fluxes are proportional to the magnitudes of the voltage analogues impressed on primary windings 18. If the voltage input is the primary winding remains constant, there will be no change in the flux linking the secondary winding 20. If this linking flux increases or decreases, a voltage proportional to the rate of change of flux is induced in the secondary winding 20. I provide my switch with means for sequentially varying the linking fluxes of the respective transformers to produce a series of secondary winding voltages in windings 20.

A shaft 36 rotatably supported by any convenient means in housing 10 carries an arm 38 for rotation with the shaft. I mount a member 40 formed of a paramagnetic material on the end of arm 38. Any convenient means such as a motor or the like (not shown) may be employed to drive shaft 36 to rotate arm 38 and move the member 40 past the gaps 34 of the transformers 12. As has been explained hereinabove, the voltage input to a primary winding 18 produces a flux in the core including legs 14 and 16, which flux links the secondary winding 20. It will be appreciated that the voltage input produced by the sensing means will not in the normal course of events vary at a sufficiently great rate to induce any appreciable voltage in the secondary winding 20. The flux produced by the current flow in a primary winding 18 has a path of a certain reluctance through air gap 34. If the member 40 is disposed adjacent an air gap 34, it provides an alternate path of reduced reluctance for the flux. In other words, the magnetic member 40, when disposed adjacent an air gap 34, reduces the reluctance of the flux path for the flux produced by the primary winding current. As a result of this reduced reluctance, more flux is permitted to link the secondary winding when the member 40 is disposed adjacent the air gap 34. As the member 40 passes by an air gap, the flux linking the secondary winding increases to a maximum value and then drops again to its normal value as the member 40 moves away from the gap.

If the member 40 is of the form shown in Figure 4, the rate of change of flux is such as will induce a voltage of the form shown in Figure 4a and identified as "$e_1$."

If a different shape member is used, a different wave form will result. For example, if the magnetic member is formed with a substantially U-shaped cross section, as is indicated for a member 42 in Figure 5, the resultant wave form will be as is shown in Figure 5a and identified as "$e_2$." In Figure 6, a paramagnetic member 44 having an E-shaped cross section produces a wave form identified as "$e_3$" shown in Figure 6a.

It will be appreciated that as arm 38 rotates, member 40 sequentially passes the air gaps 34 of the transformers 12. As a result, a series of signals spaced in time are induced in the transformer secondary windings 20. The magnitude of a secondary winding signal is proportional to the magnitude of the voltage analogue impressed across the primary winding 18. Consequently, the output from conductors 30 and 32 is a series of signals, the respective magnitudes of which are proportional to the voltage analogues fed to the transformer primary windings. The signals may be distinguished from each other to determine their relationship with the voltage analogue producing sensing means by correlating the signals with the position of arm 38.

In the form of my switch shown in Figure 1 eight transformers 12 are arranged in a ring on the inner surface of housing 10. The number of transformers which may be included in a ring is determined by the physical dimensions of the switch with respect to the dimensions of the transformers.

Referring now to Figure 2, I have shown a development of a number of rings of transformers 12 indicated generally respectively by the reference characters 46, 48, 50 and 52 coaxially arranged in side-by-side relationship. I connect by conductors 28 all the secondary windings 20 of the rings 46, 48, 50 and 52 in series and provide a pair of output conductors 54 and 56. The member 40 in this form of my invention is elongated to permit its passage by the air gaps 34 of all the rings. In order that the output signals appearing on conductors 54 and 56 be properly spaced in time, I stagger the air gaps of the respective rings so that member 40 is adjacent only a single air gap at any instant. As the member 40 moves in the direction of the arrow in Figure 2 from a position adjacent the leg 16 of the first transformer 12 of ring 46, it first bridges the air gap 34 of the first transformer 12 of ring 46. Next it bridges the air gap of the first transformer 12 of ring 48. It then sequentially bridges the first gap 34 in ring 50, the first gap 34 in ring 52 and the second air gaps 34 of the respective rings 46, 48, 50 and 52, and so forth, until it has passed all the gaps. The resulting series of output signals for typical values of the voltage analogues fed to the primary windings 18 are shown in Figure 3 and identified as $v_1$ to $v_{16}$, inclusive.

From the foregoing, it will be seen that in the form of my invention shown in Figures 1 and 2 I vary the flux linking the secondary windings 20 by changing the reluctance of the flux path as the member 40 moves past the gaps 34.

Referring now to Figures 7 and 8, an alternate form of my invention includes a plurality of transformers, each of which is indicated generally by the reference character 54. Each transformer 54 includes a core having a first pair of legs 56 and 58 forming one section of the core and a second pair of legs 60 and 62 forming the other section of the core. The two core sections are separated by an air gap indicated generally by the reference character 64. The cores for the transformers 54 may be formed in any convenient manner known to the art. For example, they may be made up of laminations stamped or cut from paramagnetic material and shaped to form legs 56 and 58 or 60 and 62. The laminations may be so cut and shaped as to form a ring of core sections which ring may be disposed adjacent a similar ring to form a complete ring of transformer cores.

Each pair of legs 56 and 58 conveniently carries the secondary winding 65 of a transformer 54. Each pair of legs 60 and 62 carries the primary winding 66 of a transformer 54. Respective pairs of conductors 68 and 70 feed the voltage analogues from any appropriate sensing means (not shown) to the respective primary windings 66. I connect the secondary windings 65 in series by means of conductors 72 and provide a pair of output conductors 73 and 75. It will be appreciated that a voltage analogue such as $V_{in}$ impressed on a primary winding 66 produces a flux $\phi$, proportional to the voltage analogue, which links the corresponding secondary winding 65. The normal path of this flux is indicated in Figure 10. In this form of my invention I shield the primary winding 66 and the secondary winding 65 from each other to vary the flux $\phi$ linking the secondary winding to induce a signal $V_{out}$ in the secondary winding. A shaft 74 carries an arm 76 formed of paramagnetic material for rotation with the shaft. Arm 76 is positioned on shaft 74 to be disposed between the core sections of transformers 54. It will be appreciated that when shaft 74 is driven by any convenient means (not shown) such as a motor or the like, arm 76 rotates to pass sequentially through the air gaps 64 of transformers 54. When arm 76 is disposed in the air gap 64 between a pair of transformer core sections, most of the flux $\phi$ produced by the flow of current in the primary winding 66 passes through arm 76, rather than through the core section including legs 56 and 58. As a result, the flux $\phi$ linking the secondary winding 65 drops to a very low value and then rises again to its normal value as the arm passes out of the air gap. As a result of this change in the flux linking the secondary winding 65, a signal is induced therein which is proportional to the rate of change of flux. By way of example, I have shown in Figure 12 six analogue voltage levels $v_1$ to $v_6$ of various values. In Figure 13 I have indicated the corresponding secondary winding signals corresponding to the voltage levels in Figure 12. It will be seen that this form of my contactless switch also produces secondary winding signals which have magnitudes proportional to the respective primary winding voltage analogues.

Referring now to Figure 9, I have shown a number of rings indicated generally respectively by the reference characters 78, 80, 82 and 84 of transformers 54 coaxially arranged in side-by-side relationship. I connect all the secondary windings of the transformers in rows or rings 78, 80, 82 and 84 together and provide a pair of output conductors 86 and 88. I provide respective paramagnetic members similar to arm 76 and indicated respectively by reference characters 90, 92, 94 and 96 for the rows 78, 80, 82 and 84. I mount all of the members 90, 92, 94 and 96 on a common shaft in relative angular positions as is indicated by the broken line 98 in Figure 9. Owing to the relative angular disposition of these members, only one of the members at any instant is disposed in an air gap 64. Consequently, the output on conductors 86 and 88 is a series of signals spaced in time and having respective magnitudes corresponding to the voltage analogues impressed on the primary windings 66. This series of signals is similar to the series depicted in Figure 3.

In operation of the form of my invention shown in Figure 1, arm 38 is driven by any convenient means past the air gaps 34 of transformers 12 sequentially to vary the reluctance of the transformer flux paths. As the member 40 passes a gap, a signal, the magnitude of which is proportional to the voltage analogue impressed on the primary winding 18, is induced in the secondary winding 20. In the course of one revolution of the arm 38 a series of signals spaced in time appears on conductors 30 and 32. The magnitudes of these signals correspond respectively to the magnitudes of the voltage analogues impressed on the primary windings 18.

The operation of the form of my invention shown in Figure 2 is similar to that described in connection with Figure 1. The oblique or staggered arrangement of the rings of transformers ensures that the signals appearing at conductors 54 and 56 are spaced in time.

In operation of the form of my invention shown in Figures 7 and 8, any convenient means drives arm 76 sequentially through the air gaps 64 of transformers 54 to shield the primary and secondary windings 66 and 65 from each other. When the arm 76 is disposed in a gap 64, it provides an alternate path for the flux $\phi$ produced by the voltage analogue to vary the flux linking the secondary winding 65. The result of this operation is a series of signals on conductors 73 and 75 which signals have magnitudes corresponding to the respective voltage analogues impressed on primary windings 66.

The operation of the form of my invention shown in Figure 9 is similar to that described in connection with Figures 7 and 8. The relative angular spacing of members 90, 92, 94 and 96 ensures that the output signals appearing on conductors 86 and 88 are properly spaced in time.

While I have shown and described my invention as including transformers arranged in a ring and rotating flux varying means, it is to be understood that the transformers could be arranged in a line and the flux varying means moved linearly with respect to them.

It will be seen that I have accomplished the objects of my invention. I have provided a contactless switch for producing a series of signals, the respective magnitudes of which correspond to a plurality of voltage analogues. My switch includes no brushes and contacts. It is more rugged and reliable than sampling switches of the prior art. It readily lends itself to a multiple arrangement in which a large number of voltage analogues are sampled.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A contactless switch for sampling a plurality of voltage analogues of respective physical variables including in comination a plurality of sources of respective voltage analogues, a plurality of series magnetic circuits each including a core and an air gap formed in the core, respective primary windings carried by said cores, respective secondary windings carried by said cores, means for connecting said sources to the respective primary windings to apply the voltage analogues respectively to the primary windings to produce fluxes in said cores, paramagnetic means, and means for moving said paramagnetic means past said core air gaps to produce respective signals in said secondary windings, said signals being proportional respectively to said voltage analogues, said plurality of magnetic circuits including a first ring of cores and a second ring of cores coaxial with said first ring, the air gaps of said first cores being staggered with respect to the air gaps of said second cores, said means for moving aid paramagnetic means including means for rotating said paramagnetic means about the common axis of said rings past said air gaps.

2. A contactless switch for sampling a plurality of voltage analogues of respective physical variables including in combination a plurality of sources of respective voltage analogues, a plurality of magnetic circuits each including a core and an air gap formed in the core, respective primary windings carried by the cores, respective secondary windings carried by the cores, means for connecting said sources to the respective primary windings to apply the voltage analogues respectively to the primary windings to produce fluxes in said cores, a paramagnetic member of low retentivity, and means for moving said member past said core air gaps in succession to produce respective signals proportional to said voltage analogues in said secondary windings, said member having a dimension such that it bridges only that air gap of the core past which it moves.

3. A contactless switch as in claim 2 in which said cores are arranged in a ring and in which said means for moving said paramagnetic member comprises means for rotating said paramagnetic member about the axis of said ring past said air gaps.

4. A contactless switch as in claim 2 in which each of said cores is formed in two sections with an air gap between said sections, said sections respectively carrying a primary winding and a secondary winding, said means for moving said paramagnetic member including means for moving said paramagnetic member through said gaps between said sections to shield said secondary and primary windings from each other.

5. A contactless switch as in claim 2 in which said cores are arranged in a ring, each of said cores being formed in two sections with the air gap between said sections, said sections respectively carrying a primary winding and a secondary winding, said means for moving said paramagnetic member including means for rotating said paramagnetic member about the axis of said ring through said air gaps to shield said primary and secondary windings from each other.

6. A contactless switch as in claim 2 in which said plurality of cores includes a first ring of cores and a second ring of cores coaxial with the first ring, each of said cores being formed in a pair of sections separated by said air gap, the sections of each pair respectively carrying a primary winding and a secondary winding, said switch including a second paramagnetic member having said dimension to form a pair of paramagnetic members and means for mounting said members in relative angular relationship, said means for moving the paramagnetic member comprising means for rotating said members about the axis of said rings through the respective air gaps of said rings.

7. A contactless switch as in claim 2 including means for connecting said secondary windings in series.

8. A contactless switch as in claim 2 in which said paramagnetic member comprises a paramagnetic member having a U-shaped cross section.

9. A contactless switch as in claim 2 in which said paramagnetic member comprises a paramagnetic member having an E-shaped cross section.

10. A contactless switch as in claim 2 in which said paramagnetic member comprises a paramagnetic member formed with a plurality of teeth.

References Cited in the file of this patent

UNITED STATES PATENTS

| | | |
|---|---|---|
| 2,231,118 | Guenther | Feb. 11, 1941 |
| 2,401,175 | Morrill | May 28, 1946 |
| 2,740,110 | Trimble | Mar. 27, 1956 |